# United States Patent Office 3,043,859
Patented July 10, 1962

3,043,859
FLUOROALKYLMERCURY FLUOROCARBOXYL-
ATES AND THEIR PREPARATION
Paul E. Aldrich, Wilmington, Del., assignor to E. I. du Pont de Nemours and Company, Wilmington, Del., a corporation of Delaware
No Drawing. Filed May 5, 1960, Ser. No. 26,968
10 Claims. (Cl. 260—431)

This invention is directed to a new class of compounds of mercury, having as particular objects provision of novel fluorinated organic mercury compounds and of a process for preparing the same.

Previous studies on fluorinated organic mercury compounds have been directed principally to mercury salts of polyfluorocarboxylic acids and polyfluoroalkyl mercurials. These compounds have a divalent mercury atom which is bonded either solely to oxygen or solely to carbon. Fluorinated compounds having mercury bonded to both carbon and oxygen have been an unexplored group of products whose properties were unknown. It is to this class of mercury compounds that the present invention is directed.

The new compounds consist of divalent mercury bonded by one valence to a polyfluorinated hydrocarbon group and by a second valence to a polyfluorinated hydrocarbon acyl group, in which groups the alpha-carbons, i.e., the carbons bonded to mercury or to the carbonyl group, are otherwise bonded only to fluorine or carbon, and beta-carbons, if present, are bonded to at least one fluorine and at most one hydrogen, the remaining valences of said beta-carbons being satisfied by fluorine or carbon.

The new compounds are represented by the following formula:

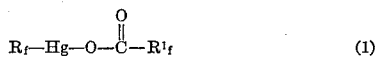

(1)

where $R_f$ and $R^1_f$ are polyfluorinated hydrocarbon groups in each of which the alpha-carbon, i.e., the carbon bonded either to the mercury or to the C=O group, is otherwise bonded only to fluorine or carbon and any beta-carbon, if present, is bonded to at least one fluorine and at most one hydrogen, the remaining valences of said beta-carbons being satisfied by fluorine or carbon. The groups represented by $R_f$ and $R^1_f$ can be alike or different; they can be aliphatic, cycloaliphatic, aromatic or combinations of these structures. The groups are preferably free of ethylenic and acetylenic unsaturation, i.e., free of non-benzenoid unsaturation. Such preferred groups are aliphatically saturated and they have at most 18 carbon atoms. In an especially preferred group of compounds $R_f$ and $R^1_f$ are polyfluoroalkyl groups in which the alpha-carbon is bonded only to fluorine or carbon, said group consisting of carbon, fluorine and at most one hydrogen, which hydrogen is on a beta-carbon or on a terminal carbon of the group.

The following compounds are illustrative of the invention and fall within its scope as defined above: perfluoropropylmercury perfluorobutyrate, ω-hydroperfluoroethylmercury, ω-hydroperfluoropropionate, ω-hydroperfluorobutylmercury ω-hydroperfluorovalerate, perfluoroamylmercury perfluorohexanoate, ω-hydroperfluorooctylmercury ω-hydroperfluorononanoate, perfluorononylmercury perfluorodecanoate, perfluorocyclohexylmercury perfluorohexahydrobenzoate, perfluorocyclohexylmethylmercury perfluorocyclohexylacetate, ω-hydroperfluorotetradecylmercury ω-hydroperfluoropentadecanoate, ω-hydroperfluorooctadecylmercury ω-hydroperfluorononadecanoate, perfluoroisopropylmercury perfluoroisobutyrate, perfluoroisobutylmercury perfluoro-α-methylbutyrate, and perfluorophenylmercury perfluorobenzoate.

The compounds of the invention are generally low-melting white crystalline solids which can be isolated in pure form and which are stable at ordinary atmospheric temperatures. The low molecular weight compounds, i.e., the compounds having very short polyfluorohydrocarbon groups, tend to be hygroscopic. The compounds are stable in storage, employing conventional methods to exclude atmospheric contamination and moisture, if necessary. The compounds have good thermal stability and they can, in many cases, be distilled without decomposition. The thermal stability shown by the compounds is unusual and unexpected in view of the presence of a salt-like linkage in the compound, i.e., the bond between the mercury and the polyfluorinated hydrocarbon acyl group. The compounds also have excellent hydrolytic stability and they are not decomposed by contact with water.

The low molecular weight compounds, particularly trifluoromethylmercury trifluoroacetate, are water-soluble. Compounds in which the mercury is bonded to groups having a higher number of carbons, are soluble in many of the conventional organic liquids, in particular, oxygenated solvents such as ether, dioxane, tetrahydrofuran, dimethyl formamide, ethyl acetate and the like. The compounds are slightly soluble in hydrocarbons and partially soluble in halogenated hydrocarbons, such as chloroform and carbon tetrachloride.

The compounds should be handled with the precautions customarily observed in working with mercury compounds to avoid unnecessary contact with the skin or inhalation of the vapors.

A simple and economical method for preparing the new compounds consists in heating the mercuric salt of a polyfluorocarboxylic acid, in which acid the alpha-carbon is bonded only to fluorine or carbon and any beta-carbon is bonded to at least one fluorine and at most one hydrogen with the remaining valences of the beta-carbon being satisfied by fluorine or carbon, to a temperature at which carbon dioxide is evolved and maintaining the mercuric salt at said temperature until evolution of carbon dioxide is completed.

The mercuric salts employed in the process are represented by the following general formula:

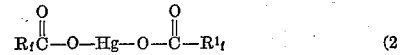

(2)

where $R_f$ and $R^1_f$ have the means given previously in Formula 1, both in its broadest form and in its preferred form.

The process, which forms a part of this invention, may be represented by the following equation:

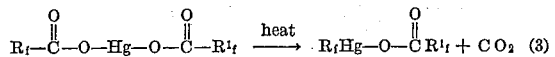

(3)

It is evident from this equation that 1 mole of carbon dioxide is released for each mole of mercuric salt employed in the process. The result is unexpected and it could not have been predicted from available data on pyrolysis of mercuric salts of organic acids or of other metal salts of organic acids.

The temperature at which evolution of carbon dioxide begins varies somewhat with the mercuric salt which is employed but, in general, the temperature will lie between about 200° C. and 500° C. The operable temperature is easily determined by heating the mercuric salt at progressively higher temperatures until evolution of gas begins. A preferred temperature range lies between 250° and 450° C.

The pressure employed in the process is not critical. As a matter of convenience, the reaction is usually conducted at atmospheric pressure although pressures higher or lower than atmospheric may be used.

The process may be conducted by a batch or continuous method. In a batch method, the mercuric salt is charged into a corrosion-resistant container which, for convenience, is attached to a condenser unit and a receiver. The charged container is heated by any convenient means to the decomposition temperature of the mercuric salt and heat is maintained on the container until evolution of carbon dioxide is complete, as shown by cessation of bubbling. The rate of heating to the desired reaction temperature is not critical. Heat input into the container is then increased until the reaction product distills. The distillate is collected in the receiver and the product is obtained in a form which is substantially pure. In an optional mode of operation, the reaction vessel, condenser and receiver are connected to a vacuum pump, after evolution of carbon dioxide has ceased, and the reaction product is distilled under reduced pressure. Distillation of the product from the reaction vessel is not an essential step in the process, it simply provides a convenient means of isolating the product.

The time required for completion of the reaction is not critical. It will, of course, be related to the size of the charge and to the rate of heat input. Agitation of the reaction mixture during the heating operation will facilitate release of the carbon dioxide but agitation is not an essential feature of the process. For a batch process the time normally lies between about 5 minutes and 2 hours after the desired temperature of reaction has been reached.

The pyrolysis can be conducted, if desired, in an inert atmosphere, e.g., nitrogen or helium, to minimize side reactions. The number of side reactions is small and it is not essential to use an inert gas or to exclude air during operation of the process.

In a continuous method of operation, the mercuric salt can be fed into one end of a corrosion-resistant chamber which is maintained at the decomposition temperature of the salt and the heated salt is moved through the chamber to the exit end while carbon dioxide is evolving. The crude product which discharges can be purified by distillation or by other conventional methods, e.g., crystallization, sublimation, and the like.

It is readily apparent from the above description that the process for obtaining the new compounds is a simple pyrolysis of a mercuric salt of a polyfluorocarboxylic acid and that the process employs conventional equipment. However, as stated earlier, the result obtained in the process is unexpected, i. e., the release of 1 mole of carbon dioxide for each mole of mercuric salt employed, as shown in Equation 3.

The products of the reaction are, in many cases, obtained in reasonably pure state directly in the reaction vessel and they can be employed without further purification steps. The products can, if desired, be distilled, crystallized, chromatographed, sublimed or subjected to other well-known procedures to remove any impurities which may be present.

The following examples illustrate the compounds of the invention and the method for preparing them. The preparation of the mercuric salts which are employed as reactants is also described.

*Example I*

(A) A mixture of 21.7 parts of mercuric oxide, 22.8 parts of trifluoroacetic acid and 100 parts of water is stirred in an evaporating dish until solution of the mercuric oxide is complete. The reaction mass is heated on a steam bath until the water has evaporated and the solid residue is dried in a desiccator over sulfuric acid for 2–3 days. There is obtained mercuric trifluoroacetate as a highly hydroscopic white crystalline compound which is used for pyrolysis without further purification.

(B) The mercuric trifluoroacetate, obtained in part A, is charged into a distillation flask which is connected to a condenser and receiver. The charged flask is immersed in a Wood's metal bath which is heated to 300° C. Evolution of carbon dioxide begins and a product distills which has a vapor temperature of 250–260° C. There is obtained in the receiver 21.8 parts of a white crystalline solid which is trifluoromethylmercury trifluoroacetate, a compound of the formula

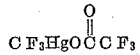

The compound is purified by chromatographic methods, employing silicic acid and chloroform. It is very hygroscopic and, because of this fact, can be obtained dry only with difficulty. The product, as obtained, melts at 83–92° C. Its identity is confirmed by the nuclear magnetic resonance spectrum.

*Example II*

(A) A solution of 31.2 parts of pentafluoropropionic acid in a small amount of water is added dropwise and with stirring to a slurry of 21.7 parts of mercuric oxide in 10–20 parts of water. The slurry is evaporated to dryness to yield mercuric pentafluoropropionate, a white crystalline compound, which is pyrolyzed as described in the following paragraph without further purification.

(B) A distillation flask is charged with 28 parts parts of mercuric pentafluoropropionate and the flask is connected to a condenser and receiver. The flask is immersed in an oil bath which is heated to 300° C. for 1 hour. The oil bath is removed and the flask is heated over a free flame until the reaction product distills. There is obtained 16 parts of pentafluoroethylmercury pentafluoropropionate, a colorless liquid which boils at 225° C. The compound is further purified by careful distillation under reduced pressure, boiling at 113° C. at 8 mm. mercury pressure. After standing at prevailing atmospheric temperature (about 25° C.), the compound forms a white crystalline solid, melting at 49–51° C. The identify of the compound, which has the formula

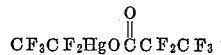

is confirmed by the nuclear magnetic resonance and infrared spectra and by elemental analysis.

*Analysis.*—Calc'd for $C_5F_{10}HgO_2$; C, 12.45; F, 39.38; Hg, 41.58. Found: C, 12.79, 12.46; F, 39.66; Hg, 41.66.

*Example III*

(A) A mixture of 40 parts of perfluorohexanoic acid (B.P. 159° C.), 13.8 parts of mercuric oxide (reagent grade) and about 160 parts of methanol is stirred in an evaporating dish until solution of the mercuric oxide is complete. The reaction mixture is heated on a steam bath until all methanol is evaporated. The dish and contents are placed in a desiccator over concentrated sulfuric acid and allowed to stand until thoroughly dry. There is obtained 50.8 parts of mercuric perfluorohexanoate, a waxy solid, which is used in the pyrolysis process, as described in the next paragraph, without further purification.

(B) The mercuric perfluorohexanoate, obtained in part A, is charged into a distillation flask (capacity, 50 parts of water) which is connected to a condenser and receiver. The charged flask is immersed in a Wood's metal bath which is heated to 250° C. The reaction mass is maintained at this temperature until evolution of carbon dioxide is complete. The bath temperature is then raised rapidly to 330° C. and the material which distills at about 270° C. (with some decomposition) is collected. There is obtained 34.7 parts (69% yield) of perfluoroamylmercury perfluorohexanoate, a white solid which melts at 69.5–70° C. The compound is further purified by chromatographing on 100-mesh silicic acid (Mallinckrodt) with chloroform as the eluent, followed by crystallization from chloroform and sublimation of the crystals. The identity of the compound, which has the formula

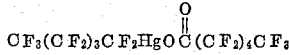

is confirmed by elemental analysis.

*Analysis.*—Calc'd for $C_{11}F_{22}O_2Hg$: F, 53.40; Hg, 25.64. Found: F, 53.70, 53.55; Hg, 25.58, 25.61.

Example IV (A) A reaction vessel (capacity, 125 parts of water) is charged with 14.6 parts of 3H-tetrafluoropropionic acid and 10.8 parts of yellow oxide of mercury. The mixture is diluted with about 40 parts of methanol and the mixture is stirred. About 10 parts of water is added and stirring of the reaction mixture is maintained for about 1 hour. The mixture is filtered and the filtrate is heated on a steam bath until all solvent is removed. A hygroscopic solid residue is obtained which is placed in a desiccator over potassium hydroxide pellets and it is stored under reduced pressure for about 3 days. The solid product is then powdered in a dry atmosphere and there is obtained 19.1 parts of mercuric 3H-tetrafluoropropionate.

(B) The product of part A, i.e., mercuric 3H-tetrafluoropropionate, is charged into a distillation flask which is connected to a condenser and receiver. The distillation flask is heated in a Wood's metal bath to 330° C. Material distills over at a still head temperature of 240° C. The crude product, which contains some free mercury, is redistilled under reduced pressure to yield 10.2 parts of 2H-tetrafluoroethylmercury 3H-tetrafluoropropionate, a white crystalline solid, B.P. 165° C./13 mm., M.P. 58.0–58.5° C. The identity of the compound which has the formula $$HCF_2C\ F_2HgO\overset{O}{\underset{\|}{C}}C\ F_2C\ F_2H$$

is confirmed by elemental analysis.

*Analysis.*—Calc'd for $C_5H_2F_8O_2Hg$: F, 34.02. Found: F, 34.05.

The process, as illustrated in the examples, is generically operable with mercuric salts as defined in Formula 2 to produce compounds of Formula 1. To illustrate, mercuric 5H-perfluorovalerate forms 4H-perfluorobutylmercury 5H-perfluorovalerate, mercuric perfluorovalerate yields perfluorobutylmercury perfluorovalerate, mercuric perfluoro($\alpha$-methyl)butyrate yields perfluoro-2-butylmercury perfluoro($\alpha$-methyl)butyrate, mercuric 9H-perfluorononanoate yields 8H-perfluorooctylmercury 9H-perfluorononanoate, mercuric 13H-perfluorotridecanoate yields 12H-perfluorododecylmercury 13H-perfluorotridecanoate, mercuric 3H-perfluoropentanoate yields 2H-perfluorobutylmercury 3H-perfluoropentanoate, mercuric 3H-perfluorohexanoate yields 2H-perfluoroamylmercury 3H-perfluorohexanoate, mercuric perfluorocyclohexanoate yields perfluorocyclohexylmercury perfluorohexahydrobenzoate, mercuric perfluorotetradecanoate yields perfluorotridecylmercury perfluorotetradecanoate and mercuric perfluorobenzoate yields perfluorophenylmercury perfluorobenzoate.

The compounds of the invention are generically useful as soil fungicides and as plant growth regulants.

To illustrate, the compound of Example II, i.e., perfluoroethylmercury perfluoropropionate, applied to soil at a rate of 33 lb./acre. effectively destroys the fungus Rhizoctonia; the compound of Example III, i.e., perfluoroamylmercury perfluorohexanoate, effectively destroys the fungus Rhizoctonia at rates of application of 10–33 lb./acre. By application of the compounds to selected areas, such as rows in which seeds are to be planted, effective control of the fungus is obtained at dosages of 1.5–4.5 lb./acre.

The compounds, in addition to controlling the growth of fungus, prevent or significantly retard the growth of such broad-leaf plants as marigold, lettuce or xanthium. For this purpose, the compounds can be applied directly to the soil, as a pre-emergence herbicide, or the compounds can be applied directly as a foliar spray on the plants. The compounds are useful, therefore, as herbicides or plant growth regulants, particularly for broad-leaf plants, employing dosage rates as described for soil fungicide use.

The compounds can be applied in a number of ways which are conventionally employed in commercial practice. For soil treatment, they can, for example, be applied in pure form to the surface of the soil and admixed in the top layers of the soil by any suitable means. Generally, for either soil or plant application, they are formulated by mixing with a conventional carrier material or conditioning agent. This provides a formulation adapted for controllable and efficient application to soils or plants using well-known and conventional applicator equipment. The compounds can, for example, be used in formulations such as described in Todd, U.S. Patents 2,655,444 through 2,655,447. Adjuvants, such as dusts, solvents, wetting agents, dispersing and emulsifying agents, set forth in U.S. Patent 2,426,417, can be employed in preparing the compositions containing the compounds of the present invention. In a preferred form, the compositions are formulated as water-dispersible powders which can be prepared by admixing one or more of the active compounds with, e.g., a surface-active agent and a finely divided solid carrier, such as talc, natural clay, diatomaceous earth and other powdered diluents. The surface-active agents are used in amounts sufficient to impart dispersibility to the powder. Liquid compositions can be prepared by intimately dispersing or dissolving one or more of the compounds of the invention in conventional organic liquid herbicidal carriers.

The quantities of active compound to be employed will be determined to some extent by the type of formulation, climatic conditions, method of application, and type of vegetation or fungus which is to be controlled. Effective dosage rates are illustrated in the earlier paragraph discussing soil fungus action.

Since obvious modifications and equivalents in the invention will be evident to those skilled in the chemical arts, I propose to be bound solely by the appended claims.

The embodiments of the invention in which an exclusive property or privilege is claimed are defined as follows:

1. The process which comprises thermally decomposing, at a temperature of about 200–500° C. and with the elimination of one mole of carbon dioxide per mole of reactant mercuric salt, the mercuric salt of a polyfluorocarboxylic acid wherein the alpha-carbon is bonded only to at least one member of the class consisting of carbon and fluorine and any beta-carbon is bonded to at least one fluorine and at most one hydrogen, the remaining valences of the beta-carbon being satisfied by at least one member of the group consisting of carbon and fluorine.

2. The process which comprises thermally decomposing, at a temperature of about 200–500° C. and with the elimination of one mole of carbon dioxide per mole of reactant mercuric salt, mercuric trifluoroacetate.

3. The process which comprises thermally decomposing, at a temperature of about 200–500° C. and with the elimination of one mole of carbon dioxide per mole of reactant mercuric salt, mercuric pentafluoropropionate.

4. The process which comprises thermally decomposing, at a temperature of about 200–500° C. and with the elimination of one mole of carbon dioxide per mole of reactant mercuric salt, mercuric perfluorohexanoate.

5. The process which comprises thermally decomposing, at a temperature of about 200–500° C. and with the elimination of one mole of carbon dioxide per mole of reactant mercuric salt, mercuric 3H-tetrafluoropropionate.

6. A compound of the formula $$R_f-Hg-O-\overset{O}{\underset{\|}{C}}-R^1_f$$

wherein $R_f$ and $R^1_f$ are polyfluorinated hydrocarbon groups of up to 18 carbons wherein alpha-carbon is bonded only to at least one member of the group consisting of carbon and fluorine and any beta-carbon is bonded to at least one fluorine and at most one hydrogen, the remaining valences of the beta-carbon being satisfied by carbon.

7. Trifluoromethylmercury trifluoroacetate.
8. Pentafluoroethylmercury pentafluoropropionate.
9. Perfluoroamylmercury perfluorohexanoate.
10. 2H - tetrafluoroethylmercury 3H - tetrafluoropropionate.

References Cited in the file of this patent

UNITED STATES PATENTS 2,559,629  Berry _____ July 10, 1951

OTHER REFERENCES

Hill et al.: Organic Chemistry, October 1945, Philadelphia, p. 240.